US012363260B1

(12) United States Patent
Paiuk

(10) Patent No.: US 12,363,260 B1
(45) Date of Patent: Jul. 15, 2025

(54) CORRECTING AUDIO FEEDBACK USING CONTEXTUAL INFORMATION

(71) Applicant: Zoom Video Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 267 days.

(21) Appl. No.: 18/140,277

(22) Filed: Apr. 27, 2023

(51) Int. Cl.
*H04N 7/15* (2006.01)
*H04L 65/403* (2022.01)
*H04N 7/14* (2006.01)
*G06F 3/16* (2006.01)

(52) U.S. Cl.
CPC ............ *H04N 7/15* (2013.01); *H04L 65/403* (2013.01); *H04N 7/142* (2013.01); *H04N 7/147* (2013.01); *G06F 3/165* (2013.01)

(58) Field of Classification Search
None
See application file for complete search history.

(56) References Cited

U.S. PATENT DOCUMENTS

| | | | |
|---|---|---|---|
| 7,769,162 B2 | 8/2010 | Knutson et al. | |
| 8,462,958 B2 | 6/2013 | Kuech et al. | |
| 9,319,633 B1* | 4/2016 | Birkenes | ............. G01S 15/04 |
| 9,819,805 B2 | 11/2017 | Feldt et al. | |
| 10,880,427 B2* | 12/2020 | Ferguson | ............. H04M 3/568 |
| 2010/0183163 A1 | 7/2010 | Matsui et al. | |
| 2016/0014373 A1* | 1/2016 | LaFata | ............. H04M 9/082 |
| | | | 348/14.08 |
| 2022/0116706 A1* | 4/2022 | Carvajal | ............. H04L 65/403 |
| 2022/0303502 A1* | 9/2022 | Fisher | ............. H04L 67/104 |
| 2024/0338167 A1* | 10/2024 | Lundin | ............. H04M 3/002 |

(Continued)

OTHER PUBLICATIONS

Fukui, et al., "Double-talk robust acoustic echo cancellation for CD-quality hands-free videoconferencing system", IEEE Transactions on Consumer Electronics, doi: 10.1109/TCE.2014.6937332, vol. 60, No. 3,, Aug. 2014, pp. 468-475.

(Continued)

*Primary Examiner* — Quoc D Tran
(74) *Attorney, Agent, or Firm* — Kilpatrick Townsend & Stockton LLP

(57) ABSTRACT

Systems and methods for correcting audio feedback using contextual information are provided. A method, comprising steps performed by a first client device, includes joining a video conference hosted by a video conference provider, the video conference having a plurality of client devices. The first client device can determine first information about the first client device, the first information comprising first status information about first audio input and output devices and a position of the first client device and receive second information about a second client device of the plurality of client devices, the second information comprising second status information about a second audio input and output devices and a position of the second client device. The first client device may use the first and second information to identify a potential audio feedback loop and execute a command to prevent the potential audio feedback loop.

20 Claims, 8 Drawing Sheets

(56) References Cited

U.S. PATENT DOCUMENTS

2024/0340390 A1* 10/2024 Ullberg ................ H04M 3/568

OTHER PUBLICATIONS

Jang, et al., "Acoustic Feedback Detection for Online Video Conferencing", 2021 International Conference on Information and Communication Technology Convergence (ICTC), Jeju Island, Korea, Republic of, 2021, doi: 10.1109/ICTC52510.2021.9621087., Oct. 20, 2021, pp. 1516-1518.

Kuehl, et al., "Acoustic Howling Detection and Suppression for IP-Based Teleconference Systems", Speech Communication; 13th ITG-Symposium, Oldenburg, Germany, 2018, pp. 1-5.

* cited by examiner

CORRECTING AUDIO FEEDBACK USING CONTEXTUAL INFORMATION

FIELD

The present application generally relates to audio feedback, and more particularly relates to systems and methods for correcting audio feedback using contextual information.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
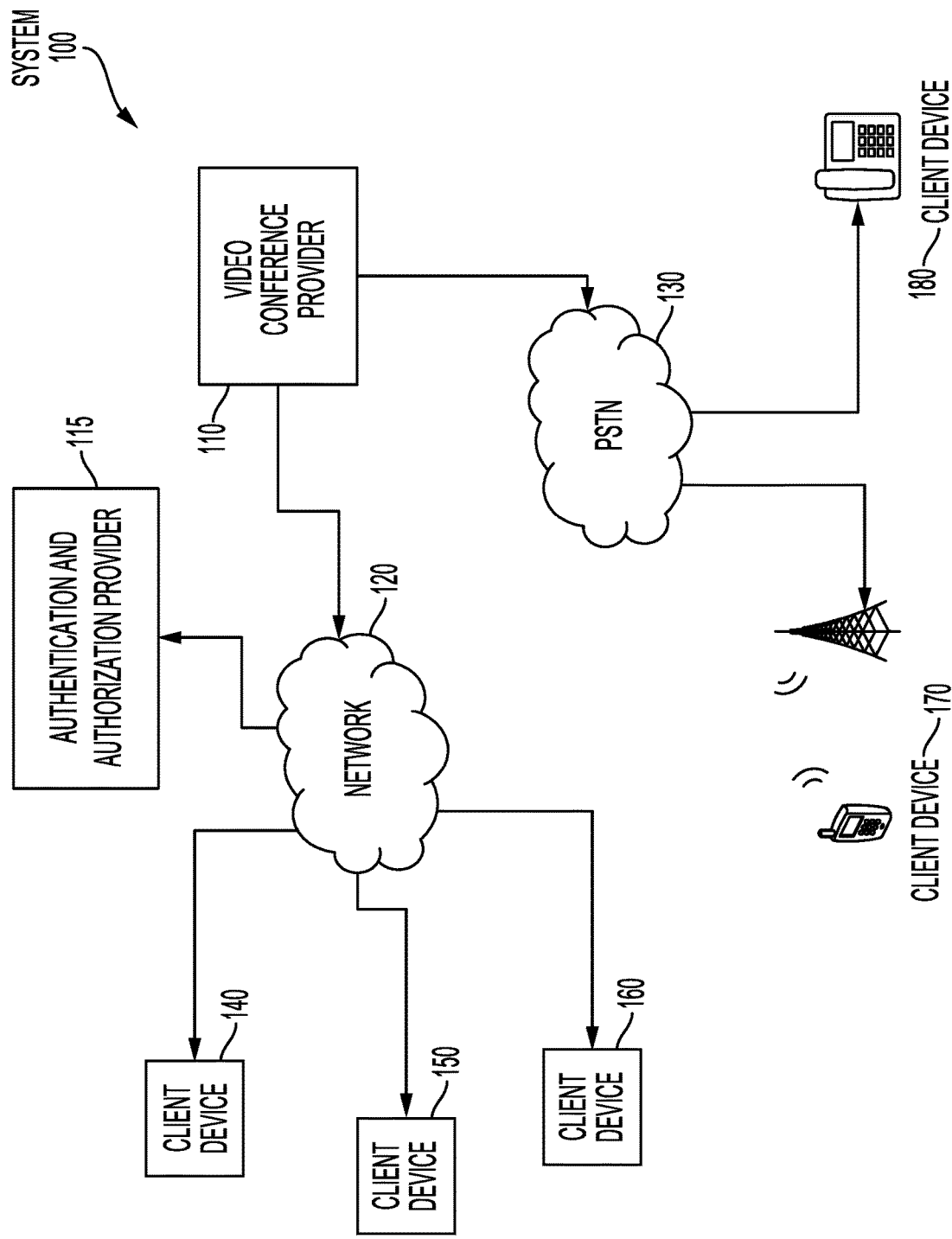
FIG. 1 shows an example system that provides videoconferencing functionality to various client devices.

Examples are described herein in the context of systems and methods for correcting audio feedback using contextual information. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing is by now a mainstay of personal and enterprise communications. In concert with hi-resolution video, video conferencing can allow for remote communication that is as effective as in-person communication. Indeed, video conferencing is so popular, in part, because of the high-fidelity audio experience that can mirror the experience of communicating with another person in the same room.

Some video conferencing platforms may allow a plurality of client devices to join a video conference hosted by a video conference provider. In this configuration, each connected client device may have one or more audio input devices and one or more audio output devices. In some client devices, the audio input and audio output devices can be selectively enabled or disabled. While multiple connected client devices with independent audio capabilities serves to enable remote communication, it may also be beset with audio problems when the client devices are in physical proximity. Audio problems may also result from particular configurations of audio input and output devices, even when the client devices themselves are not in physical proximity.

One common problem that can plague two client devices in physical proximity is an audio feedback loop. An audio feedback loop generally occurs when an audio input device unwantedly captures and, in some cases, amplifies the output of an audio output device. Audio feedback loops may have different causes. Factors that may contribute to an audio feedback loop include the status of the audio input and output devices of the client devices, the physical proximity of the client devices, the physical orientation and volume of the input and output devices, the geometry and acoustics of the rooms or spaces the client devices are in, mechanical or electrical characteristics of the speakers or microphones, among other possibilities.

For instance, echo or reverberation may be produced when an audio input device of a first client device receives audio input (e.g., the voice of a video conference participant) that is then output from an audio output device of a second client device. The audio input device of the second client device then receives the output, which is played back on the audio output device of the first client device. Thus, the first client device plays back its own input, which may qualitatively sound like an echo or cavernous reverberation sound, depending on the acoustics of the environment of the second client device. These echoes or reverberations may be undesirable for participants in video conferences and may even render communication impractical in certain cases. This type of audio feedback loop will be referred to as an echo-type audio feedback loop.

Another kind of audio feedback loop may occur when the audio input (e.g., the voice of a video conference participant) to the first client device is played on the audio output of the second client device. The audio output is captured again by the audio input device of the first client device, which is amplified, and again played on the audio output device of the second client device. The resulting sound may be described as a howl, screech, or high-pitched squeal, which is undesirable for video conference participants in most cases. The frequency or pitch of the noise may be related to the resonant frequencies of the audio input and audio output devices involved. This type of audio feedback loop will be referred to as a resonant-type audio feedback loop.

In addition to the two example types of audio feedback loops noted here, one skilled in the art will recognize that other kinds of audio feedback loops, distortions, artifacts, etc. may also be caused by the configuration of audio devices, relative positioning of devices, and similar factors. The techniques of the present disclosure, as described herein, should therefore not be interpreted to be limiting in this regard. Contextual information may be used to correct undesirable audio problems and malfunctions of a variety of kinds.

Traditionally, when undesirable audio feedback loops occur during a video conference, the participants may work together to solve the problem manually. For instance, some strategies may involve the video conference host muting participants one at a time until the audio feedback ceases; the video conference host can mute all participants-which is likely to immediately stop the audio feedback loop-after which the host can unmute one participant at a time to determine the source of the feedback loop; or participants can mute themselves until the feedback loop ceases. Other strategies may be used as well. For example, some video conference platforms may include an acoustic echo cancelation ("AEC") component. The AEC component can use software or hardware components to remove the echo- or reverb-causing audio input of a first client device from the received audio input for a second client device that unwantedly includes the audio input of the first client device.

Some of these strategies, however, are reactive and seek to resolve audio feedback issues that are already occurring. When the strategies are implemented, the audio feedback loop has already exerted some disruptive influence on the video conference. The manual strategies mentioned can be arduous and slow, particularly for video conferences with large numbers of participants. Indeed, for video conferences with hundreds of participants, some of the manual strategies, like muting participants individually, are impractical. Likewise, preventative strategies like AEC may consume significant computational or energy resources.

These difficulties can be addressed using techniques for correcting audio feedback using contextual information. In a simple example, consider a video conference including only two client devices in close proximity in the same room. Both client devices have enabled both audio input and audio output devices. An audio feedback loop may result if the audio input of a first client device captures the audio output of a second client device. On the other hand, if the first client device determines that it is in close physical proximity to the second client device with an enabled speaker whose output might be captured by its own enabled microphone, then it can automatically mute its audio input, which may prevent the audio feedback loop from occurring at all.

The following non-limiting example is provided to introduce certain embodiments. In one embodiment, a first client device joins a video conference hosted by a video conference provider, the video conference having a plurality of participants using a plurality of client devices. The first client device includes an enabled audio input device and audio output device. The audio input device receives audio input from a participant using the first client device, which may be played back on the audio output devices of the other client devices of the plurality of client devices.

Various types of audio feedback loops may result under these circumstances, depending on the enablement status of the audio input and output devices of the plurality of participants, the relative proximity or arrangement of the participants, and/or the volume, direction, orientation, etc. of the audio input and output devices. For example, a resonant-type audio feedback loop may occur if the audio input device of the first client device captures the audio output of another client device and amplifies it, resulting in an undesirable low- or high-frequency tone. In another example, an echo-type audio feedback loop may occur if the audio output of the second client device that is outputting the audio input of the first client device is captured by the audio input device of the second client device.

To prevent this, the first client device determines first information about the first client device, in which the first information comprises first status information about a first audio input device and a first audio output device and a position of the first client device. For example, the first client device may create or update a locally-persisted data structure that includes information about the status of its audio input and audio output devices. The information may be persisted in, for example, a database, cloud storage provider, shared in-memory cache, filesystem, or other suitable memory device. The data structure can also be updated with position information about the first client device. For instance, the position information may be GPS coordinates, IP address geolocation data, Bluetooth® telemetry data, and so on.

Likewise, the first client device receives second information about a second client device of the plurality of client devices, the second information comprising second status information about a second audio input device and a second audio output device and a position of the second client device. The second information may similarly involve a data structure including the current status information about the audio input and audio output devices of the second client device. The second information may also include position data about the second client device, in form suitable for comparison to the position information about the first client device. For example, the position of the second client device may include GPS coordinates that can be compared with the GPS coordinates of the first client device to be used to calculate the distance between the first client device and the second client device. The data structure received from the second client device may be added to the data structure used by the first client device to store the first information.

Using the first information and the second information, the first client device identifies a potential audio feedback loop. For example, the first client device can compare the data included in the first information and the second information by processing the updated data structure. Certain combinations of audio input and audio output device statuses may be indicative of a potential audio feedback loop. In some examples, such indications may have an associated position threshold. For instance, the audio input device of the first client device may be in the enabled status, along with the audio output device of the second client device. However, an audio feedback loop is unlikely unless the two client devices are sufficiently close for the feedback loop to result. The position information can be used to determine whether a threshold condition has been exceeded. For instance, the two client devices may exchange data using the Bluetooth® protocol (or other short-range wireless technology) as a proxy for a determination that the two client devices are sufficiently close for a potential feedback loop to result since the Bluetooth® protocol only works at a range of about 10 meters.

The first client device can then execute a command to prevent the identified potential audio feedback loop. Upon determining that a potential audio feedback loop exists based on, for example, audio input and audio output device statuses and the relative distance of the first client device and the second client device, the first client device may execute a command to cause the audio input device of the first client device to mute or become disabled, or to switch from one audio input device to another, which may prevent the audio feedback loop before it has started. The first client device may also issue commands to cause other client devices to prevent the audio feedback loop. Such commands may cause changes to audio device status if security settings explicitly allow such remote control, or may cause warnings, notifications, or messages alerting the second client device to the possibility of an audio feedback loop and recommending a particular course of action.

In some embodiments, the second client device is a fixed installation in a video conferencing room. A video conferencing room is a room that includes hardware and software for audio conferencing, wireless screen sharing, and video conferencing. The first client device may be carried inside the video conferencing room. In some examples, the video conferencing room includes sensors that can detect the presence of the first client device. For example, the first information about the first client device may include information relayed by the sensors of the video conferencing room that indicate that the first client device is inside the video conferencing room. For instance, the video conferencing room can include a camera with associated computer vision capabilities that can determine, in concert with data from other sensors, that the first client device has been carried into the video conferencing room, which may be indicative of a potential audio feedback loop. The first client device may execute a command to mute an audio input device or to use an audio input device of the video conferencing room or second client device instead of the audio input device of the first client device. In some examples, the first client device may send a warning, notification, confirmation, or alert to the user of the first client device indicating the possibility of an audio feedback loop and recommending a course of action, like muting an audio input device.

In some embodiments, the first and second information further include wireless information. For example, the wireless information may be information about the wireless network to which one or both client devices are connected. Identifying the potential audio feedback loop may include using the first wireless information and the second wireless information to determine a distance between the first client device and the second client device. Then, responsive to the distance being below a pre-determined threshold, generate an indication of the potential audio feedback loop. For instance, the wireless information may be used to gauge proximity to a wireless access point, which can be used to determine an approximate relative distance between the first and second client devices.

In some embodiments, the command to prevent the potential audio feedback loop may include instructions to mute an audio input device of one or more client devices of the plurality of client devices. In another embodiment, the command may include instructions to decrease the volume of an audio output device of one or more client devices of the plurality of client devices. In another embodiment, the command may include instructions to cause a notification to be displayed on one or more client devices of the plurality of client devices, wherein the notification includes a warning about the potential audio feedback loop. In another embodiment, the command may include instructions to deactivate an audio input device of one or more client devices of the plurality of client devices.

In some embodiments, a system may be configured to join first and second client devices to a video conference hosted by a video conference provider; determine first information about a first client device; receive second information about a second client device; use the first information and the second information to identify a potential audio feedback loop; and execute a command to prevent the potential audio feedback loop. For example, the system may be a part of the video conference provider.

The system can, in some embodiments, identify the potential audio feedback loop by determining the audio input and audio output status and position information about a plurality of devices. The system can use the status information and the relative distance information to determine a distance between two of the client devices and responsive to the distance being below a pre-determined threshold, generate an indication of the potential audio feedback loop.

The innovations of the present disclosure provide significant improvements in the field of video conferencing technology. Audio feedback loops, whether through echo, reverberation, loud and/or resonant tones, or other mechanisms can frequently disrupt video conferences, causing wasted time, frustrations, and irrecoverable lost costs. Although some mechanisms for stopping audio feedback loops that have occurred exist, they too are slow and ponderous. The added capability provided by the disclosures herein can use contextual information to automatically prevent audio feedback loops before they occur. The preventative techniques may operate both in the background and automatically, thus recovering time spent resolving audio feedback issues. Moreover, some example video conferencing platforms may provide client software that resides wholly on the client device, in contrast to software loaded from the web. Such client software, running natively, may take better or full advantage of the processing power of the client devices and allow for more substantial, robust audio processing and corrective power than may be otherwise possible.

Moreover, the techniques disclosed herein utilize a spectrum of potentially unutilized contextual information to determine the potential for audio feedback loops. For example, in addition to the status of audio input and output devices and the relative positions of the client devices, various other indications may be used for correcting audio feedback using contextual information. For example, other indications may include placement or orientation of microphones or speakers, room geometry or acoustic data, particular mechanical or electrical characteristics of microphones or speakers, network status, background noise, audio levels, filters, and so on.

These illustrative examples are given to introduce the reader to the general subject matter discussed herein and the disclosure is not limited to these examples. The following sections describe various additional non-limiting examples and examples of systems and methods for correcting audio feedback using contextual information.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
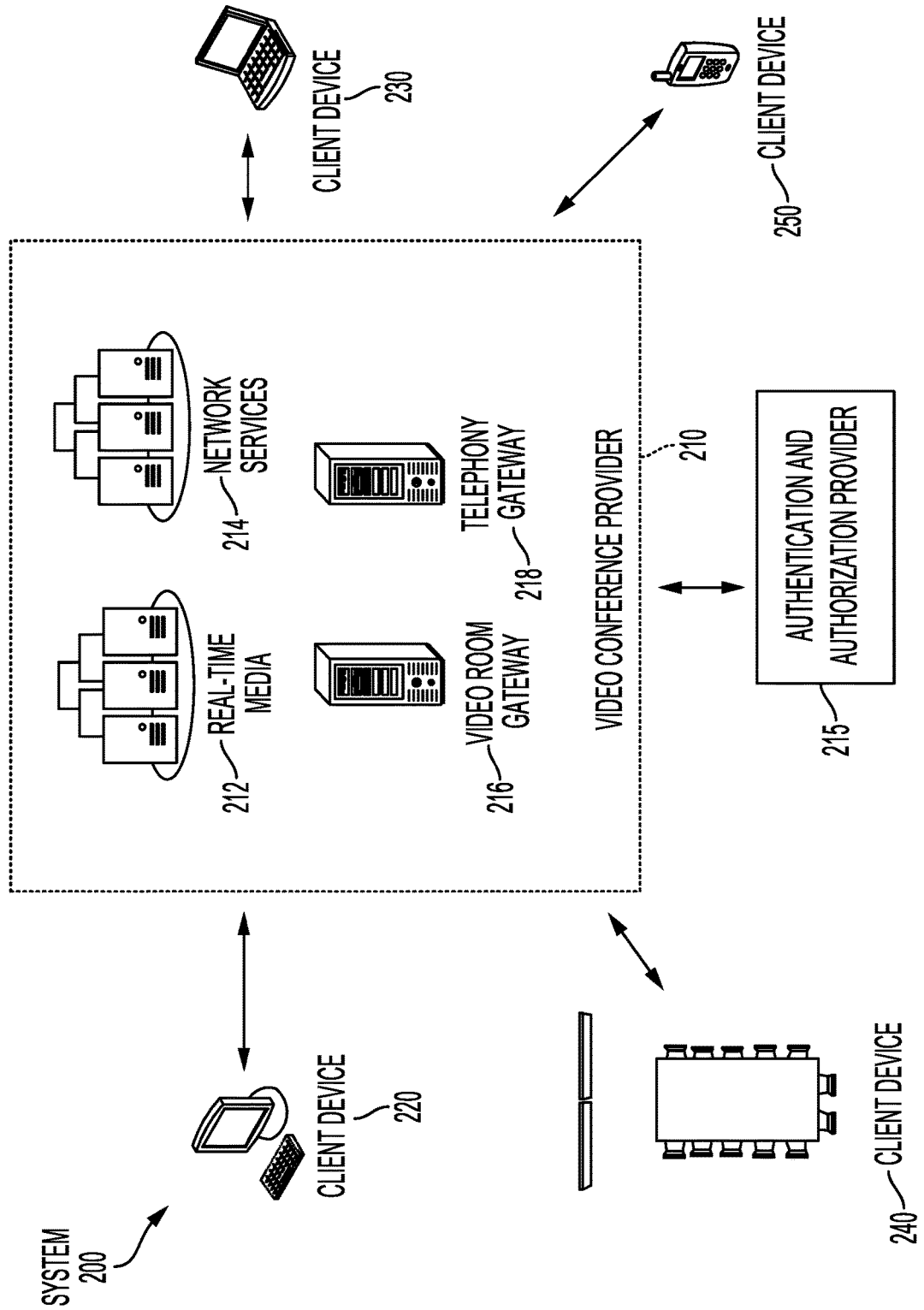
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, smartwatches, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
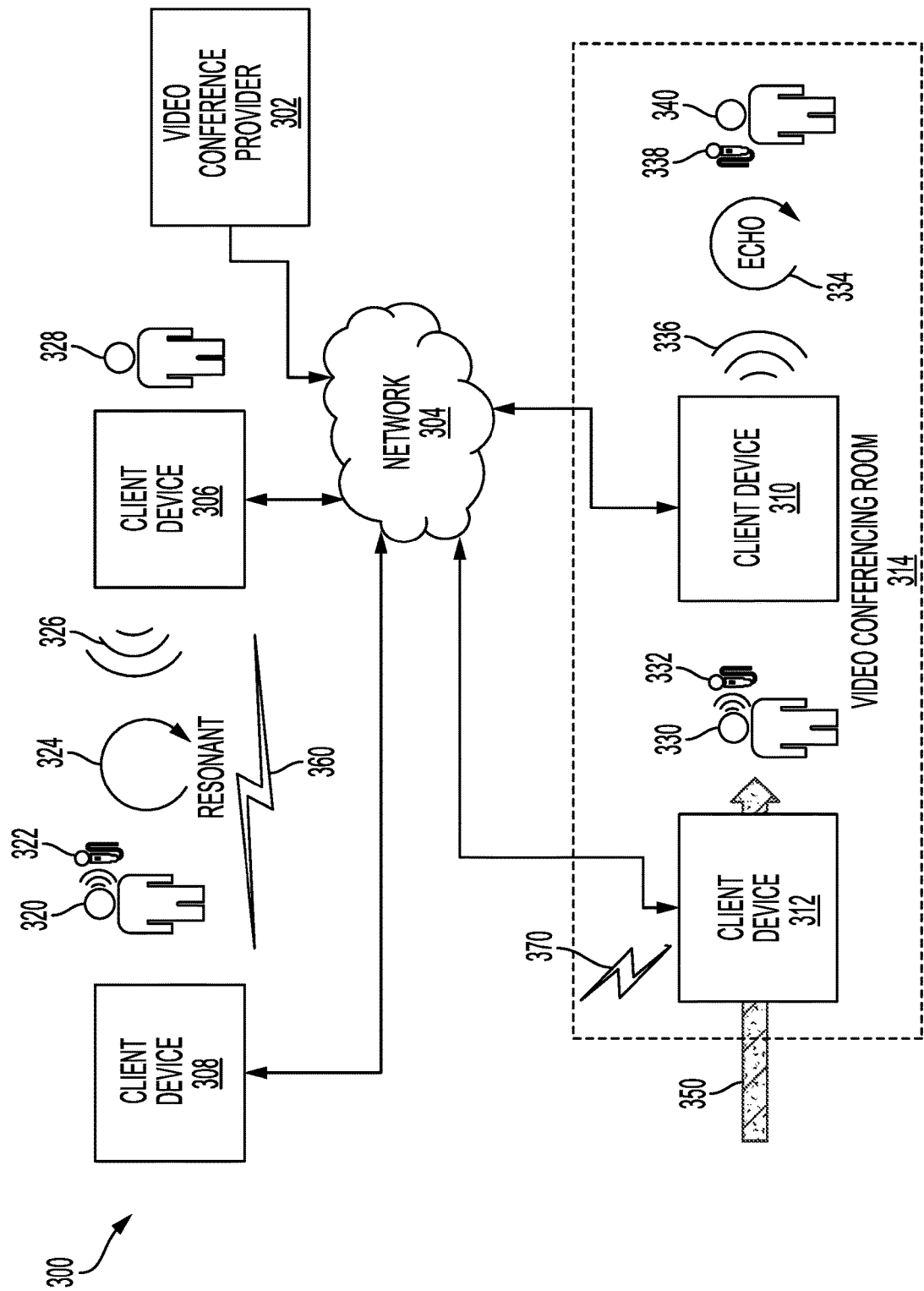
FIG. 3 shows an example of a system for correcting audio feedback using contextual information, according to some aspects of the present disclosure.

Referring now to FIG. 3, FIG. 3 shows an example of a system 300 for correcting audio feedback using contextual information, according to some aspects of the present disclosure. FIG. 3 depicts one or more client devices 306, 308, 310, 312 communicatively coupled with a video conference provider 302. For example, the client devices 306, 308, 310, 312 may be coupled to the video conference provider over a network 304. The network 304 can include public networks, private networks, the Internet, or any other suitable combination of networked devices. In some embodiments, the client devices 306, 308, 310, 312 may be configured using a peer-to-peer connection and may be directly communicatively coupled with each other.

In example system 300, the video conference provider 302 hosts a video conference with one or more participating client devices 306, 308, 310, 312. In a typical example, a plurality of client devices join together to participate in a video conference hosted by the video conference provider 302. Each client device can generate one or more video streams and one or more audio streams collected from input devices on each client device like cameras and microphones. The video and audio streams collected by the input device are sent to the video conference provider 302 which can multiplex and provide to those streams, according to certain configurations, to the remaining client devices. Example system 300 depicts two client devices 306, 308 in one video conference and two other client devices 310, 312 participating in a different video conference.

Client devices 306 and 308 are in close physical proximity, shown schematically in FIG. 3. User 320 of client device 308 provides audio input to client device 308 using audio input device 332 which may be, for instance, a microphone. For example, the audio input may be the voice of user 322. The audio stream of the audio input of user 320 is relayed to video conference provider 302. Video conference provider 302 provides the audio stream to client device 306, which plays back the voice of user 322 using audio output device 326. For instance, audio output device 326 may be a speaker.

Because the client devices 306 and 308 are in close physical proximity, the audio input device 332 of client device 308 may receive the audio output from the audio output device 326 of client device 306. The result may be a resonant-type audio feedback loop 324. Audio input device 332 captures the audio output from audio output device 326 which may then be played back again over audio output device 326, amplified. An undesirable high- or low-pitched howl or screech may result from this type of audio feedback loop. Such a noise can preclude communications altogether until the loop is broken.

In certain embodiments, a resonant-type audio feedback loop can be caused by a single client device. In this embodiment, the local audio output device outputs audio input to the audio input device causing a local, resonant-type audio feedback loop. This scenario can be mitigated by avoiding the playing back of audio input to local audio output devices, or only doing so only at a low volume. However, the techniques of the present disclosure may still be used to prevent this type of audio feedback loop.

In another example, client device 310 begins the video conference in a video conferencing room 314. A video conferencing room 314 may be a dedicated physical conference room that is equipped with video conferencing equipment and other tools for conducting remote meetings using a video conferencing platform. It may include a display device, one or more cameras, one or more microphones, and one or more speakers, as well as other hardware and software components that are integrated that may be integrated with the video conferencing platform. In some examples, the components of a video conferencing room 314 constitute a single, fixed client device. In some other examples, the components of a video conference may constitute a plurality of fixed or mobile client devices. Other client devices can be brought or carried into video conferencing room 314. For example, client device 312 may be a laptop carried by user 330, can be carried 350 into video conferencing room 314. User 330 of carried client device 312 provides audio input to client device 312 using audio input device 332 which may be, for instance, a microphone. For example, the audio input may be the voice of user 330. The audio stream of the input of user 330 is relayed to video conference provider 302. Video conference provider 302 provides the audio stream to client device 310, which plays back the voice of user 330 using audio output device 336. For instance, in video conferencing room 314, audio output device 336 may be several mounted speakers.

Because the audio input devices 338 and audio output devices 336 of the video conferencing room may be in close proximity, as well as other factors, like the acoustic properties of the room, the sensitivity of the audio input device 338, and so on, the audio output from audio output devices 336 may be captured by the audio input device 338. The result may be an echo-type audio feedback loop 334. In this example, audio input device 338 captures the audio output from audio output device 336, which is the audio input (the voice) of user 330 using client device 312. The result of this type of audio feedback loop is an undesirable and/or disruptive echo or reverberation noise, wherein an audio output device of client device 312 plays back the audio input to audio input device 332. This kind of audio feedback loop can make communication difficult or impractical until it is resolved.

In certain embodiments, the techniques of the present disclosure relating to correcting audio feedback using contextual information may be used to prevent both resonant- and echo-type audio feedback loops from occurring. For example, client devices 306, 308 may be communicatively coupled using a short-range wireless radio signal 360 using, for example, the Bluetooth® protocol. The short-range signal may be configured so that the range between the two client devices 306, 308 can be inferred. For example, if the signal strength is sufficiently strong, a short distance between the two client devices 306, 308 may be inferred. One or both client devices 306, 308 may, in response to the detection of another client device that is at close range and that is also participating in a video conference, issue a command to prevent the audio feedback loop. For example, client device 306 may mute audio output device 326, which could prevent the audio feedback loop. In another example, client device 306 may switch from one audio output device 326 to another. For instance, client device 306 may cause a switch from a speaker to a connected headset. Other means for determining the relative distance between the client devices and associated potential for an audio feedback loop are possible. For instance, the two devices could exchange position information obtained using GPS, WiFi, cellular, etc., use some other form of geolocation, use information from local network access points, among other possibilities.

In another example, client device 312 may be communicatively coupled with a sensor in video conferencing room 314 using short-range wireless radio signal 370. For instance, upon being carried into the video conferencing room 314, client devices may establish such a short-range signal 370. Client device 312, in response to the detection of being carried into the video conferencing room, may issue a command to prevent an audio feedback loop. For example, client device 312 may mute audio input device 332, which will prevent an echo of the voice of user 330. In this event, since user 330 is in the same video conferencing room 314 as other participants, such as user 340, it may be necessary to reconfigure, move, or share audio input or output devices to prevent undesired audio feedback loops. In another example, in response to the detection of being carried into the video conferencing room 314, client device 312 may display a confirmation to the user confirming the user's intention to leave the offending audio input device 332 enabled and warning him or her to the possibility of an audio feedback loop. Likewise, if the audio input device 332 is disabled prior to entering the video conferencing room 314, a confirmation or warning can be shown discouraging the user 330 from enabling it.

In some examples, the video conference provider 302 may receive an indication that user 330 has entered 350 the video conferencing room 314 carrying or wearing client device 312. Video conference provider 302 may also receive indication of the statuses of the audio input and output devices of client device 310 and 312. The video conference provider 302 can issue a command to prevent an audio feedback loop, instead of or in addition to the client devices themselves. For example, the video conference provider 302 may send a command to cause a warning or notification to appear on the display of client device 312 that indicates that an audio feedback loop may occur and recommending an action, like the muting of a microphone. In certain examples, some client devices may be configured to allow video conference provider 302 to automatically mute an audio input or output device to prevent an audio feedback loop. In such cases, explicit user consent or authorization may be required to allow for automatic adjustment of client device settings by the video conference provider 302.

Figure 4:
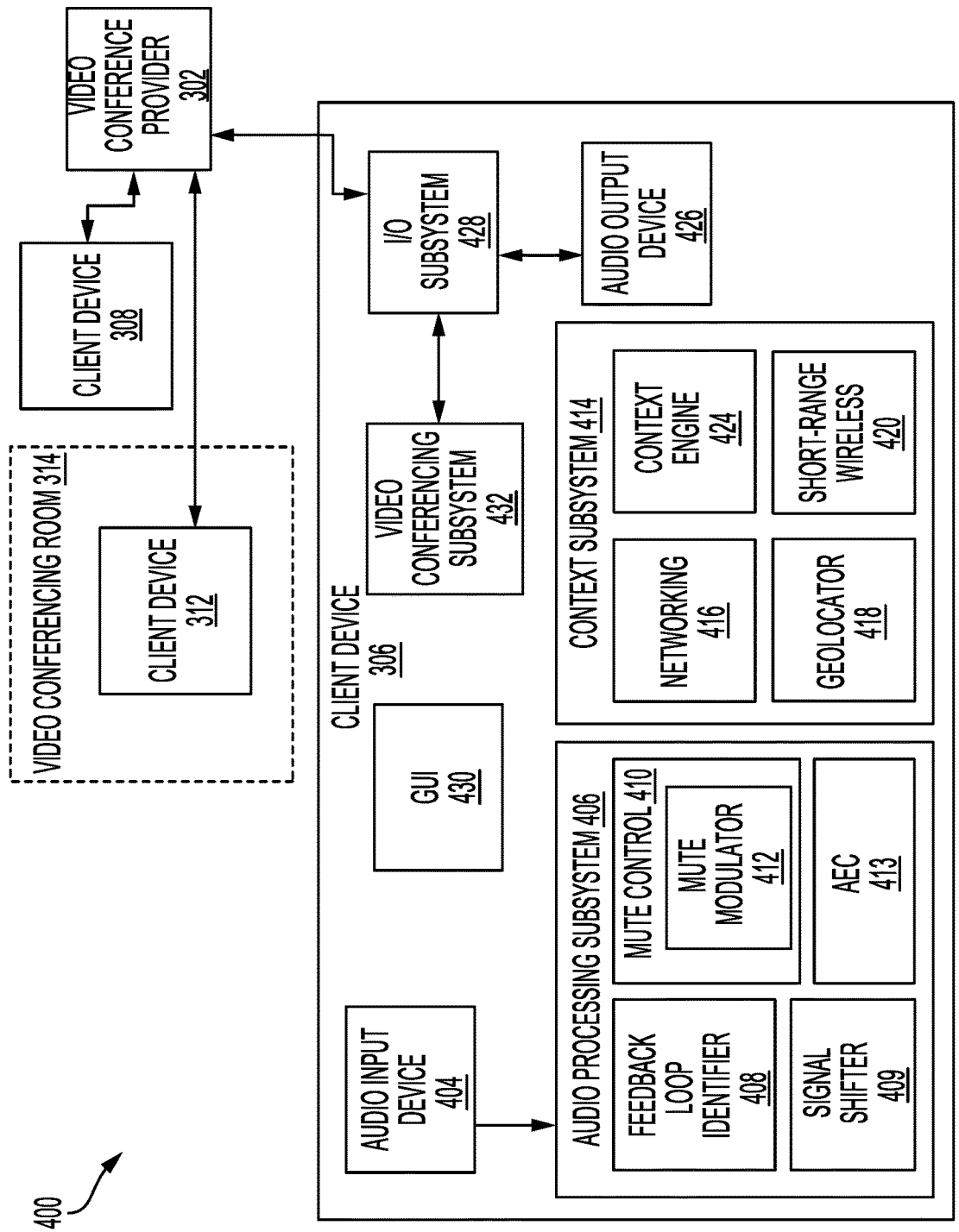
FIG. 4 shows an example of a system for correcting audio feedback using contextual information, according to some aspects of the present disclosure.

Referring now to FIG. 4, FIG. 4 shows an example of a system 400 for correcting audio feedback using contextual information, according to some aspects of the present disclosure. System 400 depicts an example implementation of client device 306. The subsystems and modules making up the client device 306 described herein may be implemented as hardware, software, or both. In some examples, some components included in client device 306 may be hosted in other devices or in remote servers. For example, the components of the context subsystem 414 may be installed on client device 306 or may be hosted in a remote server and/or accessed through a web browser. In some examples, components of client device 306 are hosted on video conference provider 302.

Client device 306 may be a personal computer, laptop, smartphone, smartwatch, tablet, or similar device suitable for executing client software for video conferencing. In some examples, the client software may run native program code on the operating system of the client device. For instance, client software running on some devices using the Windows operating system may be compiled code written in Java, C++, C#, or another suitable language. In other examples, the client software can run inside a web browser and be based on program code downloaded from the web, including program code using HTML, CSS, and JavaScript. Some devices can execute embedded client software that is encoded on a non-volatile hardware memory device like reprogrammable read-only memory or flash memory.

Figure 5:
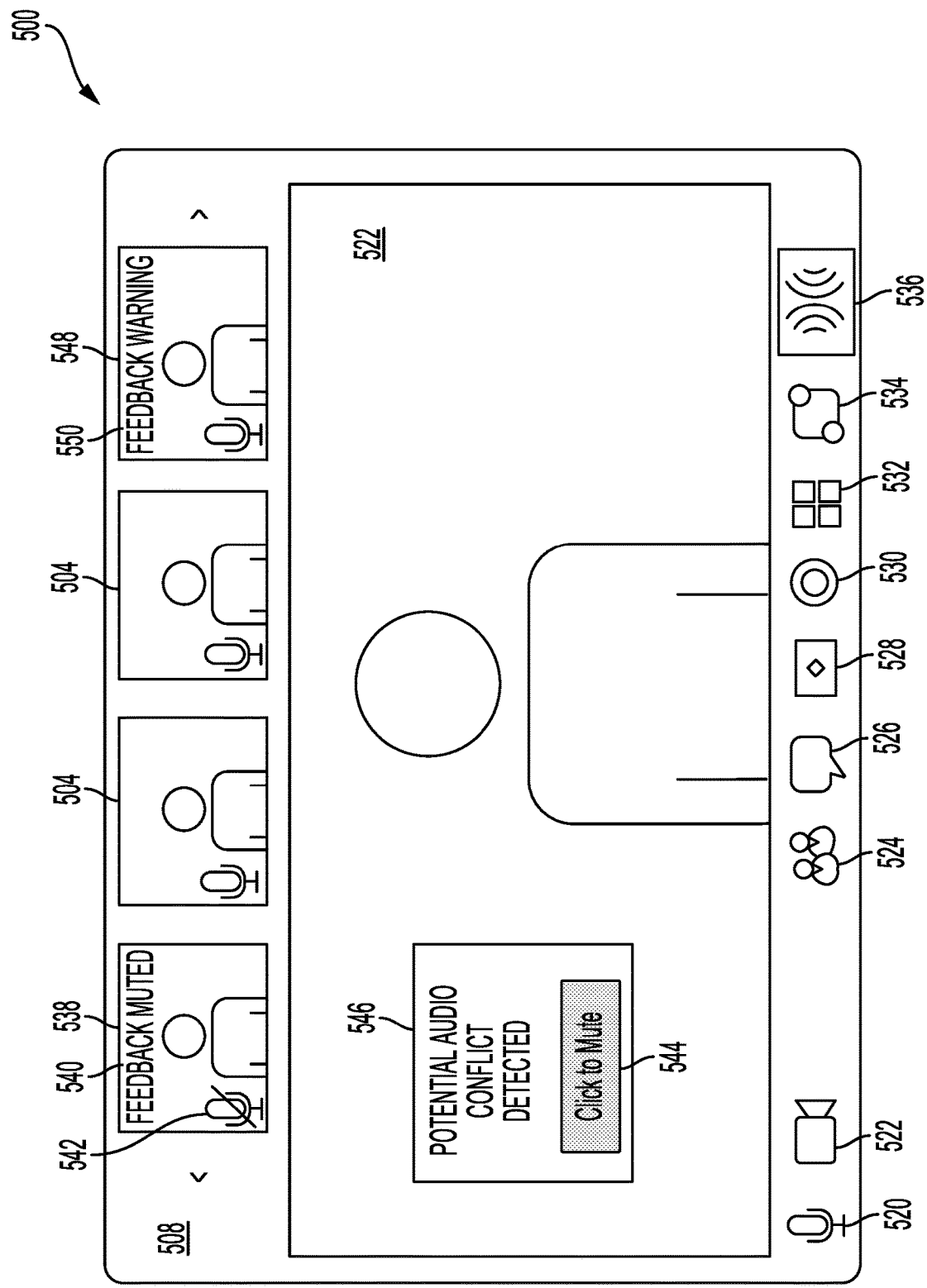
FIG. 5 shows an illustration of an example GUI that may be used with a system for correcting audio feedback using contextual information, according to some aspects of the present disclosure.

Configurations and user interfaces relating to correcting audio feedback using contextual information can be viewed and input using client device 306 by way of a graphical user interface (GUI) 430. The GUI 430 may be displayed on a personal computer screen, smartphone screen, smartwatch display, tablet screen, or the like that is internal or external to client device 306. An example user interface that may be presented by GUI 430 is depicted in FIG. 5.

The client device 306 can join a video conference hosted by video conference provider 302. The video conference may have one or more participants, including the user of the client device 306. Some video conferences may have a plurality of participants using a plurality of client devices, e.g., client devices 308, 312. The video conference provider 302 may be similar to the video conference provider 110, 210 described in FIGS. 1 and 2. The components of the video conference provider 302 may be implemented as hardware, software, or both. The video conference provider 302 may be used for planning, hosting, coordination of, and securing video conferences among a plurality of participants, among other functions. The video conference provider 302 receives audio and video streams corresponding to ongoing video conferences joined by client device 306 and multiplexes them along with streams from other participants and relays them to client devices 308, 312 of the other video conference participants for playback.

Some video conferences may include one or more participants participating from within a video conferencing room 314 (e.g., client device 312). A video conferencing room 314 may be a hardware- or software-based room system for audio conferencing, wireless screen sharing, and video conferencing. Video conferencing room 314 can be used for room-only participants, and/or remote participants joining from another location, e.g., desktop, mobile device, etc. Video conferencing room 314 may include one or more cameras and microphones and a computing device designed to receive video and audio streams from each of the cameras and microphones and connect with the video conference provider 302. Some example video conferencing rooms 314 may include sensors for detecting the presence of client devices. For instance, such sensors may include short-range wireless radios, cameras, infrared detectors, RFID detectors, and so on. Moreover, video conferencing room 314 may include configuration information available to client devices relating to the geolocation of the room itself.

On client device 306, coordination of the various video and audio inputs and outputs is performed by video conferencing subsystem 432 resulting in a display rendered as GUI 430 on a suitable display device. Video conferencing subsystem 432 may receive, in addition audio and video inputs and outputs, communications from other components of the client device 306 as well as external systems via I/O subsystem 428. For example, other client device 306 applications or third-party applications downloaded from a marketplace may be used by video conferencing subsystem 432. Likewise, video conferencing subsystem 432 can receive streaming video from a third-party streaming service for display or playback during a video conference.

The audio stream of the client device 306 is captured by audio input device 404. Audio input device 404 may be any suitable type of internal or external microphone for capture of audio information. For example, the audio input device 404 may be a built-in microphone included as part of the hardware making up the client device 306 or it may be an external, third-party commercial microphone. Some example client devices may have multiple microphones or microphones with multiple audio channels for recording multiple audio streams simultaneously.

Playback of audio streams occurs over one or more audio output devices 426. Audio output devices 426 may include speakers and/or headphones. Speakers may include a variety of speaker types and configurations. For example, speakers may include various dynamic ranges, including, for example, midrange speakers, woofers, tweeters, subwoofers, and the like. Various types of headphones may be used in different embodiments including closed-back headphones, open-back headphones, on-ear headphones, over-ear headphones, in-ear headphones, earbuds, Bluetooth® headphones, and noise-cancelling headphones, among others. These examples of audio input and output hardware are non-limiting and a person having ordinary skill in the art will recognize that a large variety of audio hardware may be used for both capturing audio and playing back audio.

The audio stream is sent to the audio processing subsystem 406. Audio processing subsystem 406 may include components relating to preventing, mitigating, or eliminating the effects of audio feedback loops. For example, some client device 306 implementations may include feedback loop identifier 408. The feedback loop identifier 408 is configured to identify an echo or reverberation caused by client device 306 that may be occurring due to the audio input device 404 receiving audio output from the audio output device 426 that includes audio input from client device 306. For example, a participant using client device 308 to connect to the video conference may speak into their audio input device (not shown). The video conference provider 302 can relay the audio stream of client device 308 to all participants in the video conference, including client device 306. Audio output device 426 may play back the audio stream of client device 308, among other received, multiplexed audio streams. If the audio input device 404 also receives the audio stream of client device 308, a participant using client device 308 may perceive an undesirable echo-type audio feedback loop. The echoed audio may in turn be relayed back to client device 306, causing another potentially amplified echo, and so on, further exacerbating the echo-type audio feedback loop. Feedback loop identifier 408 may detect the audio stream of client device 306 being input to audio input device 404. Based on the identification of an incoming audio stream input to audio input device 404, the client device 306 can take actions to prevent or mitigate a potential audio feedback loop. For example, the feedback loop identifier 408 may cause the mute controller 410 to mute the audio input device 404.

The audio processing subsystem 406 may likewise include an automatic echo cancellation ("AEC") component 413. AEC 413 filters audio from the audio input to the audio input device 404 that is due to the played back audio streams from other participants. For example, if a video conference includes a plurality of participants, for a participant using client device 306, the audio streams from the other participants may be played back on audio output device 426 and then captured by audio input device 404. As described above, the result may be an echo-type audio feedback loop resulting in undesirable echoes or other audio artifacts. AEC 413 can automatically filter the other participants' audio streams from the input audio (echo cancellation) and reduce or eliminate the undesired audio artifacts. In some examples, AEC 413 filters the undesired audio from the audio input signal by phase shifting the audio streams received from the video conference provider 302 and adding them to the input audio to audio input device 404.

Some client device 306 implementations may include a signal shifter 409. Similar to the phase shift introduced by AEC 413 for echo cancellation, signal shifter 409 may be used for identification of audio feedback loops. Various transformations may be applied to audio input received through audio input device 404 which can then be compared to certain reference signals to identify a potential or ongoing audio feedback loop. Such transformations may include, for example, phase shifts, time shifts, Fourier transforms, and so on. For example, a Fourier transform can be applied to the audio input signal to convert the signal from the time domain to the frequency domain. In the frequency domain, it may be possible to quickly, programmatically identify an audio feedback loop due to a strong intensity peak at an unexpected frequency. The client device 306 can then issue suitable commands to cause mitigation of or to terminate the feedback loop like muting the audio input device 404 using mute controller 410.

Mute control 410 can operate the mute functions of both audio input device 404 and audio output device 426 individually or in parallel. In some examples, mute controller 410 can enable or disable audio streams. For instance, audio input device 404 that is an external microphone that cannot be muted can instead be disabled. Muting, enablement, and disablement of audio devices may be implemented by both software and/or hardware functions of client device 306.

In some examples, mute controller 410 includes a mute modulator 412 component. Mute modulator 412 can be used to identify audio input devices that are causing an audio feedback loop. For example, an audio feedback loop may be identified using signal shifter 409. Client device 306 may execute instructions to cause muting modulation 412 of the input audio signal by way of mute controller 410. Mute modulator 412 may mute incoming audio periodically for periods that are too short for the human ear to notice, but during which a detectable change in the audio feedback loop may be detected. For example, to determine if client device 306 is the cause of an audio feedback loop, the mute modulator 412 may mute the audio input device 404 using mute controller 410 for several milliseconds while feedback loop identifier 408 monitors the incoming audio signal for a change in the feedback loop. If the feedback loop stops during the muted intervals, then the client device 306 is likely the cause of the audio feedback loop. The client device 306 can then issue suitable commands to cause mitigate or terminate the feedback loop like muting the audio input device 404 using mute controller 410. In some examples, the video conference provider may send commands to the plurality of connected client devices during a video conference to use mute modulator 412 in sequence or in parallel to identify the client device that is the cause of an audio feedback loop.

In certain embodiment, client device 306 includes a context subsystem 414. Context subsystem 414 includes components for determining, from contextual information, that an audio feedback loop may potentially occur. Context subsystem 414 is shown with several example components, but one skilled in the art will recognized that many other components could be used for detecting, processing, and analyzing contextual information to determine that potential audio feedback loops may occur.

Context subsystem 414 receives input from audio input device 404 and audio output device 426. For instance, context subsystem 414 can use the input to determine the statuses of audio input device 404 and audio output device 426, including enablement/disablement, configurations, settings, volume levels, and so on. The input is used by the context engine 424, discussed below, to identify potential audio feedback loops.

Context subsystem 414 includes a networking 416 component. Networking 416 can be used to determine information about the client device 306 and other client devices. For example, networking 416 can be used to provide information about IP address, subnetwork, network strength, wireless access point, and wireless service set identifier ("SSID"), among other things. This information can be used, along with information received from other client devices, to identify potential audio feedback loops. The networking 416 information may be a proxy for physical distance in some instances. For example, two client devices connected to the same wireless network may possibly be in physical proximity. Pairing this information with additional information about subnetwork, wireless access point, repeater connections, etc., may increase the confidence in an estimation of proximity based on networking 416 data.

Context subsystem 414 includes a geolocator 418. The geolocator 418 includes software or hardware components for determining the physical location of a client device. For example, one implementation may include a global positioning system ("GPS") sensor for determining the position of the client device 306 on the surface of the earth. Other example geolocator 418 components include Wi-Fi positioning, Bluetooth® beacons, cellular network positioning (e.g., trilateration), near-field communication ("NFC") positioning, radio frequency identification ("RFID") positioning, infrared positioning, among other possibilities. Geolocator 418 may determine position either as an absolute value or relative to a particular frame of reference. For instance, while using GPS, geolocator 418 may establish a position on the earth's surface represented by latitude and longitude, along with an appropriate uncertainty measurement. In another example, however, an infrared sensor may be used to determine position relative to a fixed object in a large room.

Context subsystem 414 includes a short-range wireless 422 component. For example, some implementations may use Bluetooth® technology to provide short-range wireless communications between and/or among devices. Short-range wireless communications may be established between two or more client devices that have provided affirmative consent or authorization for the connection. Once the short-range wireless connection has been established, any suitable information for correction of audio feedback can be exchanged. For instance, the status of audio input and output devices can be sent from one client device to another. Moreover, the establishment of a short-range wireless connection can itself be an indication of physical proximity since some example short-range wireless technologies have maximum ranges of several meters.

The short-range wireless connection may be configured so that the range between client devices can be inferred. For example, if the signal strength is sufficiently strong between communicatively coupled devices, a short distance between client devices may be inferred. Client devices can also passively monitor short-range wireless transmissions from other devices, and infer distances based on signal strength. For example, a client device 306 in closed proximity to another client device with Bluetooth® enabled may detect a Bluetooth® signal advertised from the nearby client device with a particular signal strength. The signal strength may be used to estimate the distance between the client device 306 and the nearby Bluetooth®-enabled client device using measured, calibrated data mapping Bluetooth® signal strength to distance. In another example, a short-range wireless sensor of a video conferencing room 314 may infer client device 312 being carried or worn into the video conferencing room 314 based on passively broadcasted pairing or heartbeat short-range wireless information from client device 312, without a communicative coupling between client device 312 and video conferencing room 314 being established.

Information from networking 416 component, geolocator 418, and/or short-range wireless 420 need not be used in isolation. The information can be combined to increase confidence in estimations of location or physical proximity. For instance, networking 416 may provide an indication that two client devices are connected to the same wireless access point, geolocator 418 may provide a GPS position estimate of the two client devices that confirms physical proximity to within an error estimable according to the capabilities of the GPS system, and short-range wireless 422 can be used to confirm that the two client devices are close enough to communicate using, e.g., Bluetooth®. Other components not shown in example system 400 may be used as well.

In some examples, the components may be used in sequence to save computational resources. For instance, networking 416 may provide a first indication of physical proximity. If networking 416 indicates physical proximity may be possible based on, for example, IP address, then geolocator 418 and/or short-range wireless 420 can be used to further determine the degree of physical proximity.

These example inputs to the context subsystem 414, as well as others, are received by the context engine 424. Context engine 424 includes program code for identifying potential audio feedback loops. In some implementations, context engine 424 may be a state machine that provides certain outputs for certain finite inputs. In a simple example, if precise geolocation for two client devices is available from geolocator 418 along with the status of all audio input and output devices, context engine 424 may identify a potential feedback loop when all 4 audio devices are enabled and the two client devices are within 2 feet of each other. In this example, the state machine of the context engine 424 make a binary determination of a potential feedback loop based on 5 variables: the status of each of the 4 audio devices and the distance between the two devices. Various variables can be used and in some cases compared with pre-determined thresholds or criteria. For example, a minimum distance threshold may be used for devices in physical proximity. A minimum volume threshold for an audio output device identified as a potential cause of an audio feedback loop may be used.

However, multiple client devices may be present, and a state machine implementation may not provide sufficient flexibility or predictive ability in such cases. Thus, in certain implementations, the context engine 424 may provide conditional logic for identifying potential feedback loops. For instance, if networking 416, geolocator 418, and/or short-range wireless 420 provide an indication that two or more client devices are sufficiently close, conditional logic may be triggered which then iterates over the status of the various implicated audio input and output devices, identifying potential audio feedback loops. In a simple example, if three client devices are in close proximity according to short-range wireless, and two or more of the client devices have their audio input devices enabled and at least one audio output device is enabled, a potential audio feedback loop may result. Similar logic may be used for various combinations of client devices, distances, audio input/output devices, as well as other inputs and subsequent comparisons to pre-determined threshold values for taking action.

If the potential for an audio feedback loop is identified, context engine 424 may output one or more commands to prevent the audio feedback loop. Commands may be executed on the client device 306 using the application programming interface ("API") exposed by the various components of the client device 306. For instance, the context engine 424 may issue commands to, for example, mute, change the volume of, change the direction of, enable, or disable the audio input device 404 or audio output device 426 on client device 306. In some examples, context engine 424 can issue commands to cause a switch from one audio input device 404 to another or from one audio output device 426 to another. For instance, context engine 424 may cause a switch from a speaker to a headset or from an external microphone to an internal microphone. Context engine 424 may also execute commands to cause notifications, warnings, alerts, etc. on client device 306 that may present a dialog box or other option to prevent a pending audio feedback loop to a user.

Context engine 424 may generate commands that can be run on other client devices. In some cases, remote client devices' security settings do not allow for execution of remote commands. However, if explicit consent or authorization is given, then a client device can exercise limited remote control over certain features of client devices. For example, if client device 306 is the host of a video conference and context engine 424 identifies a possible or ongoing audio feedback loop, context engine 424 can output commands to some or all connected client devices to cause them to mute their audio input. Context engine 424 may then unmute remote participants one-by-one until the source of the feedback loop is identified.

Context engine 424 may generate commands that include combinations of operations to be executed both on the client device 306 and on other client devices. Such combinations can include multiple steps, operations, or prerequisites. For example, in response to client device 306 unmuting audio input device 404, context engine 424 may generate a combination of commands requiring all other client devices 308, 312 on the video conference to mute their associated audio input devices. Alternatively, context engine 424 may generate a combination of commands that cause warnings, notifications, or alerts to be displayed on client devices 308, 312 when client device 306 unmutes audio input device 404.

In certain embodiments, a machine learning model may be used by context engine 424 to identify potential audio feedback loops. For example, a neural network can be trained using supervised training methods using examples of sets of information associated with various client devices and labels indicating whether an audio feedback loop resulted. Then, when client device information is later input to the trained ML model, the model may predict, based on the training, whether or not an audio feedback loop is likely to occur. Similarly, unsupervised learning techniques, like a clustering algorithm, could be used with collections of binary status indicators, configuration data, and geolocation data to identify data that precedes the occurrence of audio feedback loops based on changes in the information over time.

Any suitable machine learning model may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine learning models, such as AEGANs or variational AEGANs ("VAE-GANs").

Client device 306 can communicate with video conference provider 302 or other client devices 308, 312 using facilities provided by I/O subsystem 428. I/O subsystem 428 sends outgoing audio and video streams along with other data and telemetry relating to video conferences and other applications and subsystems of client device 306 to video conference provider 302. Likewise, I/O subsystem 428 receives multiplexed audio and video streams from other participants and relays them to video conferencing subsystem 432. I/O subsystem 428 may send and receive data from video conference provider 302 using an API provided by the video conference provider 302. In addition to data received based on direct queries, I/O subsystem 428 may receive data from external applications over webhooks, internal APIs, socket communications, Hypertext Transfer Protocol ("HTTP") sessions, Transmission Control Protocol ("TCP") connections, or other suitable protocols.

Turning next to FIG. 5, FIG. 5 shows an illustration of an example GUI 500 that may be used with a system for correcting audio feedback using contextual information. For example, GUI 500 can be used with system 300, as discussed above with respect to GUI 430. The example GUI 500 may be displayed, for example, on a screen included with client device 306. The example GUI may include controls for adjusting configurations or settings.

Example GUI 500 provides an interface for a software client that can interact with a virtual conference provider, such as virtual conference provider 302, to allow a user to connect to the virtual conference provider 302, chat with other users, or join virtual conferences. A client device, e.g., client device 306, executes a software client as discussed above, which in turn displays the GUI 500 on the client device's display. In this example, the GUI 500 includes a speaker view window 502 that presents the current speaker in the virtual conference. Above the speaker view window 502 are smaller participant windows 504, which allow the participant to view some of the other participants in the virtual conference, as well as controls ("<" and ">") to let the host scroll to view other participants in the virtual conference.

Beneath the speaker view window 502 are a number of interactive elements 520-536 to allow the participant to interact with the virtual conference software. Controls 520-522 may allow the participant to toggle on or off audio or video streams captured by a microphone or camera connected to the client device. For instance, control 520 can be used to manually mute the audio input device 404 of the client device 306. Control 524 allows the participant to view any other participants in the virtual conference with the participant, while control 526 allows the participant to send text messages to other participants, whether to specific participants or to the entire meeting. Control 528 allows the participant to share content from their client device. Control 530 allows the participant toggle recording of the meeting, and control 532 allows the user to select an option to join a breakout room. Control 534 allows a user to launch an app within the virtual conferencing software, such as to access content to share with other participants in the virtual conference.

Control 536 toggles the correction of audio feedback using contextual information. In FIG. 5, correction of audio feedback using contextual information is depicted toggled on. In some example GUIs this may be indicated with a square or other shape, but colors may also be used in addition to or instead of shapes. In some examples, enablement of correction of audio feedback using contextual information will allow the client device to prevent potential audio feedback loops that can be prevented locally to the client device only. This is because, in general, a client device can only control the configuration of the audio input and output devices on itself. However, in some configurations, a client device may have some control over other client devices. For example, if a particular client device is the host of video conference, then the particular client device may be able to control the video and audio enablement, volume settings, and other configurations of the other participants. In some examples, a client device host can issue commands to other client devices to cause changes to those client devices, but authorization or consent to execute those commands must be explicitly granted either at runtime or implicitly by joining the video conference. Correction of audio feedback using contextual information can also be provided by the video conference provider 302, which can similarly generate commands to be executed on client devices that may prevent audio feedback loops.

Participant 538 is shown with a "FEEDBACK MUTED" indication 540 that may be shown in response to an action taken to prevent an audio feedback loop. For example, the client device that displays example GUI 500 may be the host of a video conference. In that case, client device 306 can send commands to the other client devices, like the client device of participant 538, in the event that a potential audio feedback loop is detected. In this example, the client device of participant 538 has executed a mute command sent by host client device 306. The mute status is indicated by the slash through microphone status indicator 542.

The client device of example GUI 500 may also detect a potential audio feedback loop locally. For example, if both the audio input and audio output device of the client devices are enabled, resulting in a potential audio feedback loop, the client device may cause example GUI 500 to display notification window 546 indicating that potential feedback loop has been detected and providing a control 544, e.g., a button, to mute the audio of the client device. Control 544 may provide other options including disabling audio input/output devices, switching audio input devices, switching audio output devices, or others. In some examples, muted or disabled audio may be shown by a change to the icon for control 520. For instance, control 520 may be shown with a slash through it or the color may change from green to red, or another similar visual cue.

In some examples, example GUI 500 may show an indication of a potential audio feedback involving another client device. Participant 548 is shown with a "FEEDBACK WARNING" indication 550 that may be shown when one or more conditions are satisfied that might lead to a potential audio feedback loop. For instance, when two client devices are in close physical proximity, client device 306 may cause GUI 500 to display a warning similar to indication 550 to alert the users of the respective client devices to the possibility of an audio feedback loop. The association of indication 550 with participant 548 can make manual correction of the audio feedback loop by muting one or more audio devices more efficient. Additionally, the display of warnings or notifications have less severe security implications than commands to change audio device settings.

Figure 6:
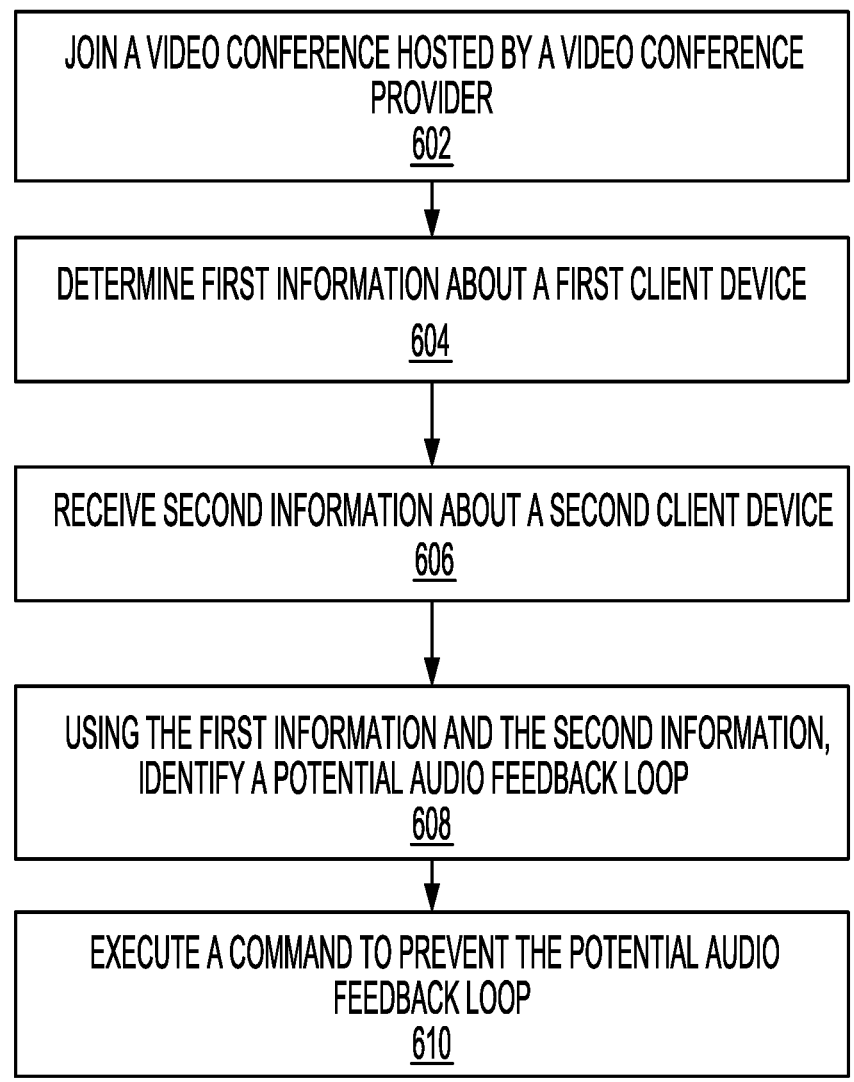
FIG. 6 shows a flowchart of an example method for correcting audio feedback using contextual information, according to some aspects of the present disclosure.

Referring now to FIG. 6, FIG. 6 shows a flowchart of an example method 600 for correcting audio feedback using contextual information. The description of the method 600 in FIG. 6 will be made with reference to FIGS. 3-5, however any suitable system according to this disclosure may be used, such as the example systems 100 and 200, shown in FIGS. 1 and 2.

It should be appreciated that method 600 provides an example method for correcting audio feedback using contextual information. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. For example, the description is given from the perspective of client device 306 but other configurations are possible. For instance, FIG. 7 and the accompanying description shows a method for correcting audio feedback using contextual information performed by a video conference provider 302. One of ordinary skill in the art would recognize many variations, modifications, and alternatives.

The method 600 may include block 602. At block 602, a first client device joins a video conference hosted by a video conference provider 302. The video conference may have a plurality of participants using a plurality of client devices. Each client device of the plurality of client devices may be characterized by information including, among other things, the status of one or more audio input devices, the status of one or more audio output devices, and position data. The information may be used, in concert with information available from other client devices, to determine whether an audio feedback loop is possible given the information available. In a typical scenario, two client devices may be in close physical proximity with audio input and output devices configured such that one or more type of audio feedback loop may result. However, method 600 may be used in any scenario where an audio feedback loop may occur including physical arrangements of client devices that are not necessarily in physical proximity. For instance, an audio feedback loop is possible with only a single client device or with multiple client devices, all in remote locations. Position and physical proximity are only one variable used by certain hardware or software components on the client device or video conference provider 302 to determine that a potential audio feedback loop exists.

The method 600 may include block 604. At block 604, the first client device determines first information about the first client device. The first information may include status information about an audio input device and audio output device of the first client device, as well as a position of the first client device. For example, the first client device may use APIs, interrupts, system method calls, and so on, to determine status information about installed or connected audio devices. The status of a connected audio input device may include binary enablement/disablement status data, volume level, type of device, levels, related operating system settings, configurations, customizations, and so on. The status of a connected audio output device may include binary enablement/disablement status data, volume level, spatial audio settings, left/right balance, type of device, levels, related operating system settings, configurations, customizations, and so on. Position information can be determined using any suitable method. For instance, the geolocator 418 component described above may be used to determine absolute or relative position using methods including GPS, Wi-Fi positioning, Bluetooth beacons, cellular network positioning, near-field communication ("NFC") positioning, radio frequency identification ("RFID") positioning, infrared positioning, among other possibilities.

One of ordinary skill in the art will immediately recognize that the first information is not limited to audio device status and position, however. The techniques of the present disclosure relate to correcting audio feedback using contextual information. Contextual information can be any information that results in determination of a potential audio feedback loop. For example, other information that may be relevant to making such a determination can include acoustic or geometrical information about the related environment, electrical specifications of connected devices, environmental data such as temperature and pressure, metadata concerning expected audio input, information regarding physical or electronic filters, etc.

The method 600 may include block 606. At block 606, the first client device receives second information about a second client device of the plurality of client devices. The second information includes status information about an audio input device and audio output device of the second client device, as well as a position of the second client device. In some examples, the second information can be relayed to the first client device by the video conference provider 302. In some other examples, the second information can be sent directly to the first client device using point-to-point networking, a short-range wireless protocol, a physical, wired connection, and so on. Direct connection between two client devices may require explicit authorization from one or both client devices to allow for the exchange of information. For example, two client devices may establish duplex communications using the Bluetooth® protocol or a similar technology. In that example, both client devices may need to authorize the connection. In addition, both client devices may impose security measures restricting, e.g., what data can be exchanged. However, second information does not necessarily require a direct connection between two client devices. For instance, passive broadcasting of pairing requests or advertising of an available Bluetooth® signal may be used to infer relative distance or other contextual information for correcting audio feedback.

The first client device receives the information from the second client device and may store it in local, ephemeral, volatile storage like RAM, or in a memory device. The memory device may a be a local hard disk or the like. The information may also be stored remotely in a network file system or a in a cloud storage provider. The first client device may similarly store the first information about itself in the same location or in a similar data structure for easier access and comparison.

For example, the first client device may store all client device information for correcting audio feedback using contextual information in an in-memory cache. The in-memory cache may include a tabular data structure indexed by a unique identifier for each client device (e.g., hostname, IP address, MAC address, etc.). The data structure may include columns or entries for each distinct, comparable data type for each client device. For instance, columns may include the enablement of the audio input device, the volume level of the audio output device, the estimated coordinates of the client device, and so on.

The method 600 may include block 608. At block 608, the first client device identifies a potential audio feedback loop using the first information and the second information. For example, the client device may include a context engine 424 or similar component for using the information available to infer a potential feedback loop. As discussed previously, some implementations may use a state machine, conditional logic, or predictive ML model, but other approaches are possible. The context engine 424 accesses the data structure updated and stored in block 606 and selects the information needed to make an inference. For example, the context engine may iterate over every field for which sufficient comparable data is available. In some cases, only partial data may be available. For instance, the status of the audio devices for the first client device may be known, while the status of the audio devices for the second client device are only partially known or completely unknown. As another example, the distance between two client devices may be known with a high degree of precision or it may be an estimate based on approximate geographic location. The context engine 424 can account for varying levels of uncertainty ranging from The method 600 may include block 610. At block 610, the first client device executes a command to prevent the potential audio feedback loop. The first client device may only have direct control over the audio devices and other functionalities local to it. Therefore, using a suitable API, the context engine 424, for instance, can execute a command to change the status of the audio input device or audio output device of the first client device. Such a command may change the enablement status, the mute status, the volume, levels, changes to the active audio input devices or output devices, changing to an alternate/secondary audio input device or output device, and so on.

The first client device may be able to issue commands to other client devices in some circumstances. For example, if the video conference is created by the user of the first client device (e.g., the user is the host of the video conference) then the video conference provider may be configured to allow a limited degree of control by the host over the client devices participating in the video conference. Such control may be limited to control over software features of the client device. Moreover, participants may explicitly or implicitly grant authorization for the host to have such control. In the case where the first client device is a host, the first client device, upon identification of a potential audio feedback loop can send commands to the other connected client device, including the second client device, to prevent the feedback loop. For example, the first client device may issue a command to mute some or all participants. Such a command may mute the audio input using a software function of the client device and may not, for example, disable an audio input device.

Figure 7:
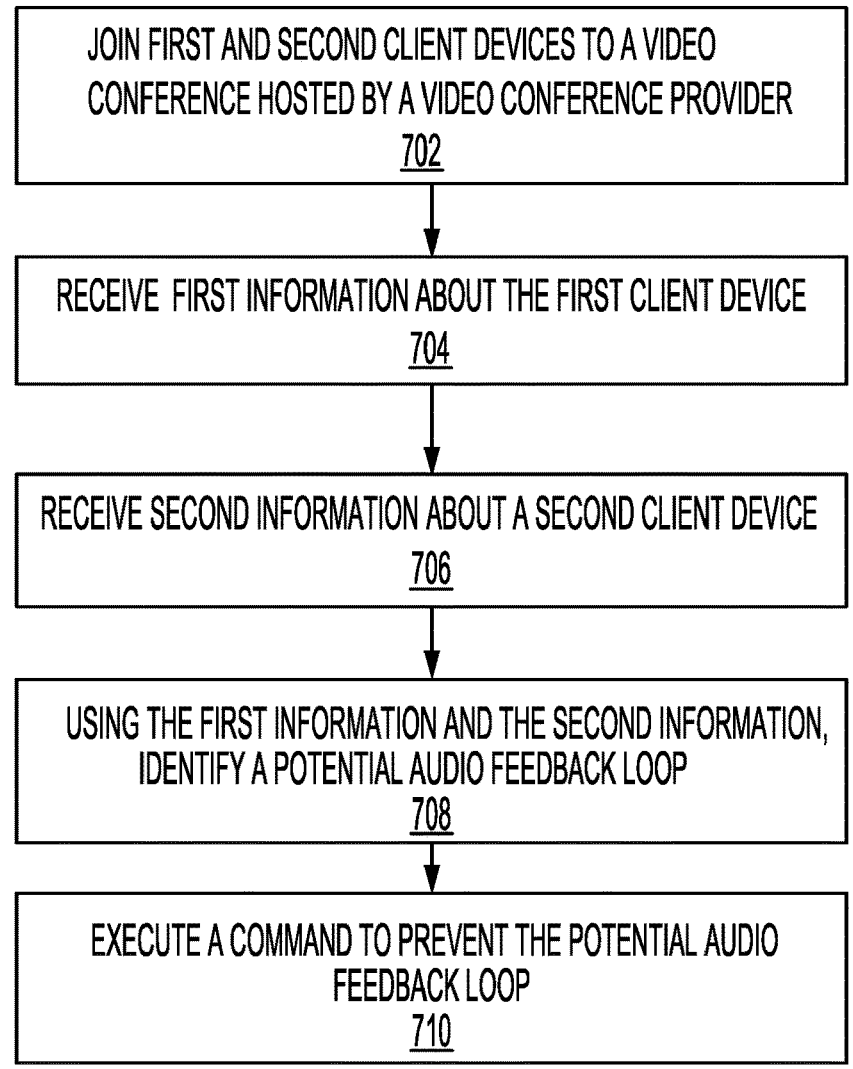
FIG. 7 shows a flowchart of an example method for correcting audio feedback using contextual information, according to some aspects of the present disclosure.

Referring now to FIG. 7, FIG. 7 shows a flowchart of an example method 700 for correcting audio feedback using contextual information. The description of the method 700 in FIG. 7 will be made with reference to FIGS. 3-5, however any suitable system according to this disclosure may be used, such as the example systems 100 and 200, shown in FIGS. 1 and 2.

It should be appreciated that method 700 provides an example method for correcting audio feedback using contextual information. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. One of ordinary skill in the art would recognize many variations, modifications, and alternatives.

The method 700 may include block 702. At block 702, first and second client devices join a video conference hosted by a video conference provider 302. The video conference has a plurality of participants using a plurality of client devices. As above, each client device of the plurality of client devices may be characterized by information including, among other things, the status of one or more audio input devices, the status of one or more audio output devices, and position data. The video conference provider 302 may have information relevant to the determination of a potential audio feedback loop for some or all of the plurality of client devices participating in the video conference as part of the normal telemetry exchanged during a hosted video conference. The video conference provider 302 may also have additional geolocation data available as a result of video conferencing network monitoring.

The method 700 may include block 704 and block 706. At block 704, the video conference provider 302 receives first information about the first client device, the first information comprising first status information about a first audio input device and a first audio output device and a position of the first client device. And at block 706, the video conference provider 302 receives second information about a second client device of the plurality of client devices, the second information comprising second status information about a second audio input device and a second audio output device and a position of the second client device. The first and second information may be obtained through direct query of the first and second client devices by the video conference provider 302 or may be provided to the video conference provider 302 as a normal part of the data exchanged during a hosted video conference. For instance, participant client devices may periodically report the status of their audio input and output devices to video conference provider 302 during a video conference.

In some examples, the video conference provider 302 may determine status information about audio input and/or audio output devices for a plurality of connected client devices. Then, upon the determination that the audio input device of at least one client device is activated and that the audio output device of at least one other client device in sufficient proximity is activated, the video conference provider 302 may generate an indication of the potential audio feedback loop and respond accordingly. For example, in some environments a plurality of client devices may be communicatively coupled to a broadcast server. A broadcast server may be a server connected to a local network that is communicatively coupled to the video conference provider 302 that is used for streaming video conference data to participants on the local network. In some examples, this broadcast server configuration is referred to as peer noding. The plurality of devices connected to the broadcast server may provide information about the physical proximity of the associated audio devices.

The video conference provider 302 may store the information about the plurality of client devices in an ephemeral in-memory cache, database, or other suitable memory mechanism. The in-memory cache may include a tabular data structure indexed by a unique identifier for each client device (e.g., hostname, IP address, MAC address, etc.). The data structure may include columns or entries for each distinct, comparable data type for each client device. For instance, columns may include the enablement of the audio input device, the volume level of the audio output device, the estimated coordinates of the client device, and so on. The data structure may be shared with other functionalities of the video conference provider 302.

The method 700 may include block 708. At block 708, the video conference provider 302 uses the first information and the second information, to identify a potential audio feedback loop. The video conference provider 302 may periodically query the in-memory cache or database to obtain a data structure suitable for identifying potential audio feedback loops. The video conference provider 302 may include one or more components similar to context engine 424 discussed above for identifying feedback loops using program code for state machines, conditional logic, ML models, or other suitable algorithms.

The method 700 may include block 710. At block 710, the video conference provider 302 executes a command to prevent the potential audio feedback loop. As the platform providing the video conference, the video conference provider 302 may have a degree of control over the audio functionality of the connected client devices. Thus, the video conference provider 302 may execute commands to cause status changes in the audio input and audio output devices of connected client devices including enablement/disablement, volume changes, direction changes, changes to the active audio input devices or output devices, changing to an alternate/secondary audio input device or output device, and so on. Video conference provider 302 may also cause warnings, alerts, notifications, and other methods for alerting participants to the possibility of an audio feedback loop along with suggesting a preventative action or actions. In each case, the security settings of each client device may restrict what actions may be automatically taken in response to commands from the video conference provider 302. On the other hand, an administrator of a group or organization of participants may be able to require certain commands for the prevention of audio feedback loops to be executed on all connected client devices.

Figure 8:
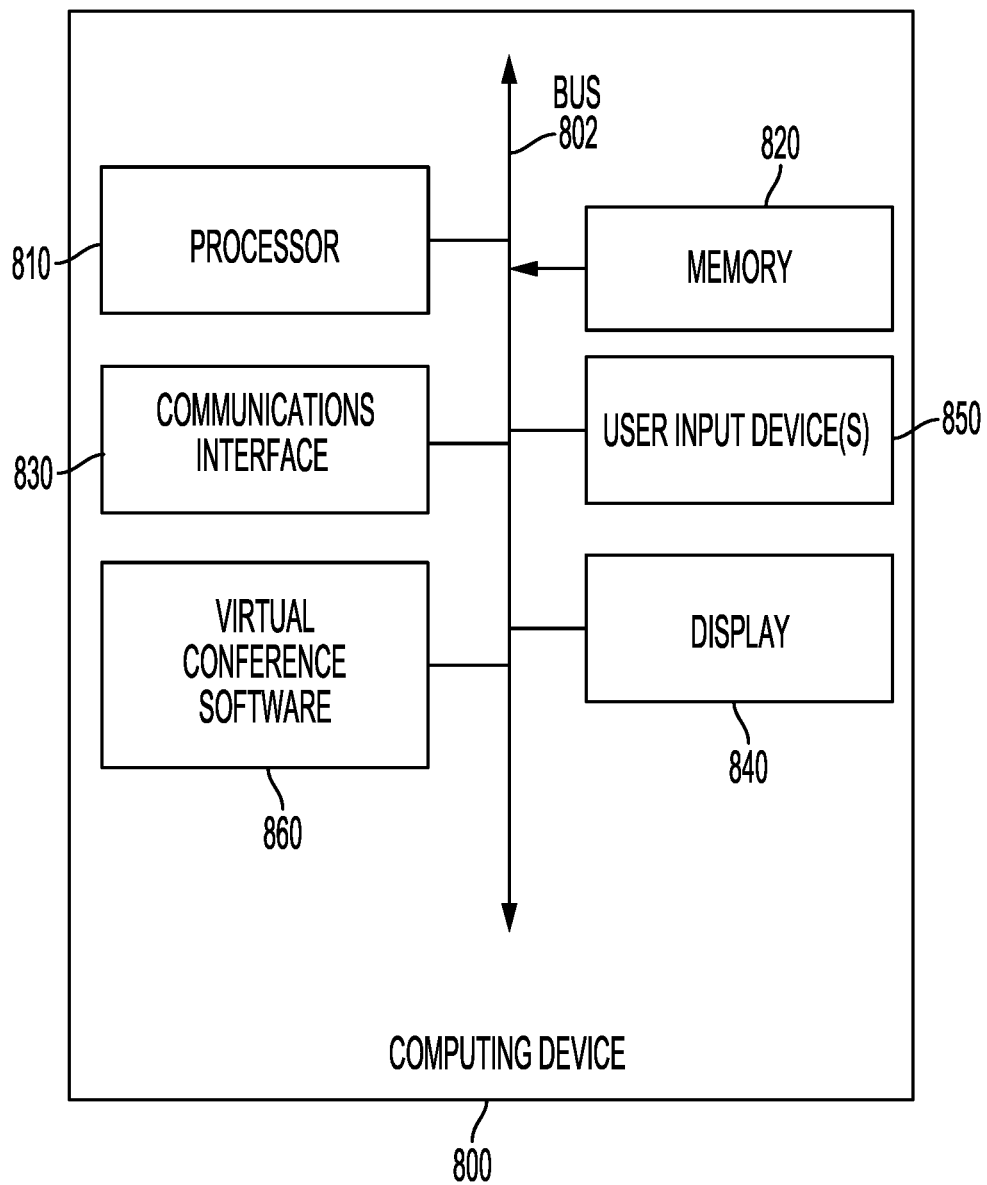
FIG. 8 shows an example computing device suitable for use in example systems or methods for correcting audio feedback using contextual information, according to some aspects of the present disclosure.

Referring now to FIG. 8, FIG. 8 shows an example computing device 800 suitable for use in example systems or methods for correcting audio feedback using contextual information according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for correcting audio feedback using contextual information according to different examples, such as part or all of the example method 600 described above with respect to FIG. 6. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes virtual conferencing software 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising steps performed by a first client device: joining a video conference hosted by a video conference provider, the video conference having a plurality of participants using a plurality of client devices; determining first information about the first client device, the first information comprising first status information about a first audio input device and a first audio output device; and a position of the first client device; receiving second information about a second client device of the plurality of client devices, the second information comprising second status information about a second audio input device and a second audio output device; and a position of the second client device; using the first information and the second information, identifying a potential audio feedback loop; and executing a command to prevent the potential audio feedback loop.

Example 2 is the method of example(s) 1, wherein identifying the potential audio feedback loop comprises determining a distance between the first client device and the second client device using the position of the first client device and the position of the second client device.

Example 3 is the method of example(s) 1, wherein identifying the potential audio feedback loop comprises: determining that the first status information about the first audio input device includes a first indication that the first audio input device is activated; determining that the second status information about the second audio output device includes a second indication that the second audio output device is activated; determining a distance between the first client device and the second client device using the position of the first client device and the position of the second client device; and responsive to the distance being below a pre-determined threshold, generate an indication of the potential audio feedback loop.

Example 4 is the method of example(s) 1, wherein: the second client device is a fixed installation in a video conferencing room; and the first client device is carried inside the video conferencing room.

Example 5 is the method of example(s) 1, wherein: the second client device is a fixed installation in a video conferencing room; and identifying the potential audio feedback loop comprises determining that the first client device has been carried inside the video conferencing room.

Example 6 is the method of example(s) 1, wherein: the first information further includes first wireless information; the second information further includes second wireless information; and identifying the potential audio feedback loop comprises: using the first wireless information and the second wireless information, determine a distance between the first client device and the second client device; and responsive to the distance being below a pre-determined threshold, generate an indication of the potential audio feedback loop.

Example 7 is the method of example(s) 1, wherein the command to prevent the potential audio feedback loop includes instructions to mute an audio input device of one or more client devices of the plurality of client devices.

Example 8 is the method of example(s) 1, wherein the command to prevent the potential audio feedback loop includes instructions to decrease the volume of an audio output device of one or more client devices of the plurality of client devices.

Example 9 is the method of example(s) 1, wherein the command to prevent the potential audio feedback loop includes instructions to cause a notification to be displayed on one or more client devices of the plurality of client devices, wherein the notification includes a warning about the potential audio feedback loop.

Example 10 is the method of example(s) 1, wherein the command to prevent the potential audio feedback loop includes instructions to deactivate an audio input device of one or more client devices of the plurality of client devices.

Example 11 is the method of example(s) 1, wherein executing the command to prevent the potential audio feedback loop comprises: receiving a permission from the second client device, wherein the permission includes authorization to operate the audio input device and audio output device of the second client device; and sending the command to the second client device to cause the audio input device of the second client device to be disabled.

Example 12 is a system comprising: a memory device; and one or more processors communicatively coupled to the memory device configured to: join first and second client devices to a video conference hosted by a video conference provider, the video conference having a plurality of participants using a plurality of client devices, each client device of the plurality of client devices having at least one audio input device and at least one audio output device; receive first information about the first client device, the first information comprising first status information about a first audio input device and a first audio output device; and a position of the first client device; receive second information about a second client device of the plurality of client devices, the second information comprising second status information about a second audio input device and a second audio output device; and a position of the second client device; use the first information and the second information to identify a potential audio feedback loop; and execute a command to prevent the potential audio feedback loop.

Example 13 is the system of example(s) 12, wherein: the second client device is a fixed installation in a video conferencing room; and the first client device includes a sensor for determining whether it is inside the video conferencing room.

Example 14 is the system of example(s) 12, wherein identifying the potential audio feedback loop comprises: determining status information about one or more audio input devices of one or more client devices; determining status information about one or more audio output devices of the one or more client devices; determining that the status information about the one or more audio input devices of the one or more client devices includes a first indication that the audio input device of at least one client device is activated; determining that the status information about the one or more audio output devices of the one or more client devices includes a second indication that the audio output device of at least another client device is activated; determining a distance between the at least one client device and the at least another client device using the position of the at least one client device and the position of the at least another client device; and responsive to the distance being below a pre-determined threshold, generate an indication of the potential audio feedback loop.

Example 15 is the system of example(s) 12, wherein the command to prevent the potential audio feedback loop comprises: identifying, from the plurality of client devices, each client device having an audio output device with a volume setting exceeding a pre-determined threshold; and muting the identified audio output devices.

Example 16 is the system of example(s) 12, wherein: the second client device is a fixed installation in a video conferencing room; the first client device includes a sensor for determining whether it is inside the video conferencing room; and the command to prevent the potential audio feedback loop includes instructions to cause a confirmation to be displayed on a display device of the first client device prior to enabling the audio input device on the first client device.

Example 17 is a non-transitory computer-readable medium storing a set of instructions, the set of instructions comprising: one or more instructions that, when executed by one or more processors of a device, cause the device to: join first and second client devices to a video conference hosted by a video conference provider, the video conference having a plurality of participants using a plurality of client devices, each client device of the plurality of client devices having at least one audio input device and at least one audio output device; receive first information about the first client device, the first information comprising first status information about a first audio input device and a first audio output device; and a position of the first client device; receive second information about a second client device of the plurality of client devices, the second information comprising second status information about a second audio input device and a second audio output device; and a position of the second client device; use the first information and the second information to identify a potential audio feedback loop; and execute a command to prevent the potential audio feedback loop.

Example 18 is the non-transitory computer-readable medium of example(s) 17, wherein the instruction to identify the potential audio feedback loop comprises: determining status information about one or more audio input devices of the plurality of client devices; determining status information about one or more audio output devices of the plurality of client devices; determining that the status information about the one or more audio input devices of the plurality of client devices includes a first indication that the audio input device of at least one client device is activated; determining that the status information about the one or more audio output devices of the plurality of client devices includes a second indication that the audio output device of at least another client device is activated; determining a distance between the at least one client device and the at least another client device using the position of the at least one client device and the position of the at least another client device; and responsive to the distance being below a pre-determined threshold, generate an indication of the potential audio feedback loop.

Example 19 is the non-transitory computer-readable medium of example(s) 17, wherein the command to prevent the potential audio feedback loop comprises muting the audio input devices of each of the plurality of client devices.

Example 20 is the non-transitory computer-readable medium of example(s) 17, wherein the instruction to identify the potential audio feedback loop comprises: identifying the plurality of client devices that are communicatively coupled to a broadcast server; determining status information about the audio input devices and the audio output devices for each of the identified plurality of client devices; and based on the determined status information, mute the audio input devices of one or more client devices of the plurality of client devices.

That which is claimed is:

1. A computer-implemented method, comprising steps performed by a first client device:
    joining a video conference hosted by a video conference provider, the video conference having a plurality of participants using a plurality of client devices;
    determining first information about the first client device, the first information comprising first status information about a first audio input device and a first audio output device; and a position of the first client device;
    receiving second information about a second client device of the plurality of client devices, the second information comprising second status information about a second audio input device and a second audio output device; and a position of the second client device;
    using the first information and the second information, identifying a potential audio feedback loop; and
    executing a command to prevent the potential audio feedback loop.

2. The method of claim 1, wherein identifying the potential audio feedback loop comprises determining a distance between the first client device and the second client device using the position of the first client device and the position of the second client device.

3. The method of claim 1, wherein identifying the potential audio feedback loop comprises:
    determining that the first status information about the first audio input device includes a first indication that the first audio input device is activated;
    determining that the second status information about the second audio output device includes a second indication that the second audio output device is activated;
    determining a distance between the first client device and the second client device using the position of the first client device and the position of the second client device; and
    responsive to the distance being below a pre-determined threshold, generate an indication of the potential audio feedback loop.

4. The method of claim 1, wherein:
    the second client device is a fixed installation in a video conferencing room; and
    the first client device is carried inside the video conferencing room.

5. The method of claim 1, wherein:
    the second client device is a fixed installation in a video conferencing room; and
    identifying the potential audio feedback loop comprises determining that the first client device has been carried inside the video conferencing room.

6. The method of claim 1, wherein:
    the first information further includes first wireless information;
    the second information further includes second wireless information; and
    identifying the potential audio feedback loop comprises:
        using the first wireless information and the second wireless information, determine a distance between the first client device and the second client device; and
        responsive to the distance being below a pre-determined threshold, generate an indication of the potential audio feedback loop.

7. The method of claim 1, wherein the command to prevent the potential audio feedback loop includes instructions to mute an audio input device of one or more client devices of the plurality of client devices.

8. The method of claim 1, wherein the command to prevent the potential audio feedback loop includes instructions to decrease the volume of an audio output device of one or more client devices of the plurality of client devices.

9. The method of claim 1, wherein the command to prevent the potential audio feedback loop includes instructions to cause a notification to be displayed on one or more client devices of the plurality of client devices, wherein the notification includes a warning about the potential audio feedback loop.

10. The method of claim 1, wherein the command to prevent the potential audio feedback loop includes instructions to deactivate an audio input device of one or more client devices of the plurality of client devices.

11. The method of claim 1, wherein executing the command to prevent the potential audio feedback loop comprises:
    receiving a permission from the second client device, wherein the permission includes authorization to operate the audio input device and audio output device of the second client device; and
    sending the command to the second client device to cause the audio input device of the second client device to be disabled.

12. A system comprising:
    a memory device; and
    one or more processors communicatively coupled to the memory device configured to:
        join first and second client devices to a video conference hosted by a video conference provider, the video conference having a plurality of participants using a plurality of client devices, each client device of the plurality of client devices having at least one audio input device and at least one audio output device;
        receive first information about the first client device, the first information comprising first status information about a first audio input device and a first audio output device; and a position of the first client device;
        receive second information about a second client device of the plurality of client devices, the second information comprising second status information about a second audio input device and a second audio output device; and a position of the second client device;
        use the first information and the second information to identify a potential audio feedback loop; and
        execute a command to prevent the potential audio feedback loop.

13. The system of claim 12, wherein:
    the second client device is a fixed installation in a video conferencing room; and
    the first client device includes a sensor for determining whether it is inside the video conferencing room.

14. The system of claim 12, wherein identifying the potential audio feedback loop comprises:
    determining status information about one or more audio input devices of one or more client devices;
    determining status information about one or more audio output devices of the one or more client devices;
    determining that the status information about the one or more audio input devices of the one or more client devices includes a first indication that the audio input device of at least one client device is activated;
    determining that the status information about the one or more audio output devices of the one or more client devices includes a second indication that the audio output device of at least another client device is activated;

determining a distance between the at least one client device and the at least another client device using the position of the at least one client device and the position of the at least another client device; and responsive to the distance being below a pre-determined threshold, generate an indication of the potential audio feedback loop.

15. The system of claim 12, wherein the command to prevent the potential audio feedback loop comprises:

identifying, from the plurality of client devices, each client device having an audio output device with a volume setting exceeding a pre-determined threshold; and muting the identified audio output devices.

16. The system of claim 12, wherein:

the second client device is a fixed installation in a video conferencing room;

the first client device includes a sensor for determining whether it is inside the video conferencing room; and the command to prevent the potential audio feedback loop includes instructions to cause a confirmation to be displayed on a display device of the first client device prior to enabling the audio input device on the first client device.

17. A non-transitory computer-readable medium storing a set of instructions, the set of instructions comprising:

one or more instructions that, when executed by one or more processors of a device, cause the device to:

join first and second client devices to a video conference hosted by a video conference provider, the video conference having a plurality of participants using a plurality of client devices, each client device of the plurality of client devices having at least one audio input device and at least one audio output device;

receive first information about the first client device, the first information comprising first status information about a first audio input device and a first audio output device; and a position of the first client device;

receive second information about a second client device of the plurality of client devices, the second information comprising second status information about a second audio input device and a second audio output device; and a position of the second client device;

use the first information and the second information to identify a potential audio feedback loop; and execute a command to prevent the potential audio feedback loop.

18. The non-transitory computer-readable medium of claim 17, wherein the instruction to identify the potential audio feedback loop comprises:

determining status information about one or more audio input devices of the plurality of client devices;

determining status information about one or more audio output devices of the plurality of client devices;

determining that the status information about the one or more audio input devices of the plurality of client devices includes a first indication that the audio input device of at least one client device is activated;

determining that the status information about the one or more audio output devices of the plurality of client devices includes a second indication that the audio output device of at least another client device is activated;

determining a distance between the at least one client device and the at least another client device using the position of the at least one client device and the position of the at least another client device; and responsive to the distance being below a pre-determined threshold, generate an indication of the potential audio feedback loop.

19. The non-transitory computer-readable medium of claim 17, wherein the command to prevent the potential audio feedback loop comprises muting the audio input devices of each of the plurality of client devices.

20. The non-transitory computer-readable medium of claim 17, wherein the instruction to identify the potential audio feedback loop comprises:

identifying the plurality of client devices that are communicatively coupled to a broadcast server;

determining status information about the audio input devices and the audio output devices for each of the identified plurality of client devices; and based on the determined status information, mute the audio input devices of one or more client devices of the plurality of client devices.

\* \* \* \* \*